United States Patent
Quiroz de la Mora et al.

(10) Patent No.: US 10,684,474 B2
(45) Date of Patent: Jun. 16, 2020

(54) HEAD UP DISPLAY WITH COMBINER ELEVATION—SELF LOCKING MECHANISM AND FLEXIBLE COVER

(71) Applicant: Continental Automotive Systems, Inc., Auburn Hills, MI (US)

(72) Inventors: Luis Ernesto Quiroz de la Mora, Tlaquepaque (MX); Johan Gomez Martinez, Zapopan (MX); Daniel Alejandro Laguna Chavez, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/430,705

(22) Filed: Jun. 4, 2019

(65) Prior Publication Data
US 2019/0377179 A1    Dec. 12, 2019

Related U.S. Application Data

(60) Provisional application No. 62/681,788, filed on Jun. 7, 2018.

(51) Int. Cl.
*H05K 7/00* (2006.01)
*G02B 27/01* (2006.01)

(52) U.S. Cl.
CPC .. *G02B 27/0149* (2013.01); *G02B 2027/0159* (2013.01)

(58) Field of Classification Search
USPC .......................................... 361/728
See application file for complete search history.

(56) References Cited

U.S. PATENT DOCUMENTS

| | | | |
|---|---|---|---|
| 8,385,074 B2 * | 2/2013 | Karl | B60R 11/0229 361/679.41 |
| 8,427,751 B2 | 4/2013 | Rumpf et al. | |
| 2002/0167189 A1 * | 11/2002 | Nakamura | G02B 27/0149 296/70 |
| 2014/0320382 A1 | 10/2014 | Moussa et al. | |
| 2016/0299343 A1 * | 10/2016 | Chien | G02B 27/0149 |
| 2017/0227767 A1 * | 8/2017 | Chen | G02B 27/0149 |
| 2018/0129125 A1 * | 5/2018 | Chen | G03B 21/10 |

* cited by examiner

*Primary Examiner* — Hung S. Bui

(57) ABSTRACT

A head up display with combiner elevation-self locking mechanism and flexible cover, the head up display comprises an elevation segmented gear coupled to a combiner holder. The combiner holder comprises a combiner holder pin, the combiner holder additionally comprising a combiner mirror. A lock coupled to the combiner holder and is configured to lock the combiner holder pin in place.

20 Claims, 15 Drawing Sheets

HEAD UP DISPLAY WITH COMBINER ELEVATION—SELF LOCKING MECHANISM AND FLEXIBLE COVER

BACKGROUND

The movement of a combiner is usually locked in display position by an additional mechanism. The additional mechanism for the lock introduces extra costs, extra space, extra noise sources, and extra tolerances that must be considered in the project. The invention introduces a self locking mechanism that needs no extra components but only a feature integrated on the combiner elevation gear to lock the combiner in display position. A head up display with combiner elevation and a self locking mechanism with a flexible cover would be an improvement over the prior art.

DETAILED DESCRIPTION

Figure 1:
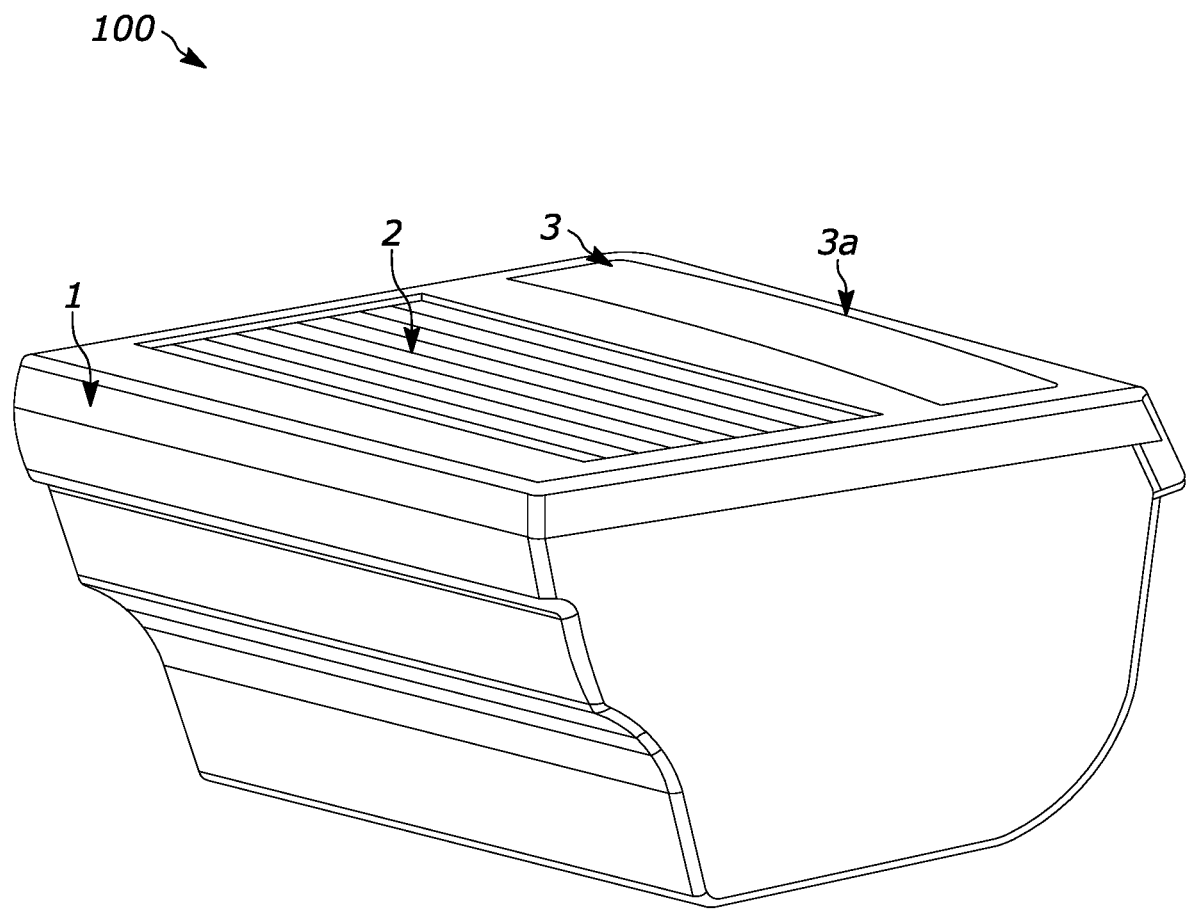
FIG. 1 is a perspective view of the head up display with a combiner elevation-self locking mechanism and flexible cover with the flexible cover extended.

FIG. 1 is a perspective view of a head up display 100 with a combiner elevation-self locking mechanism and flexible cover with the flexible cover extended. The head up display comprises a case 1, a flexible cover 2 for a transparent cover 1a (See FIG. 2) and a cover 3 for a combiner (not shown) referred to hereafter as a combiner cover 3, and an outlet opening 3a.

Figure 2:
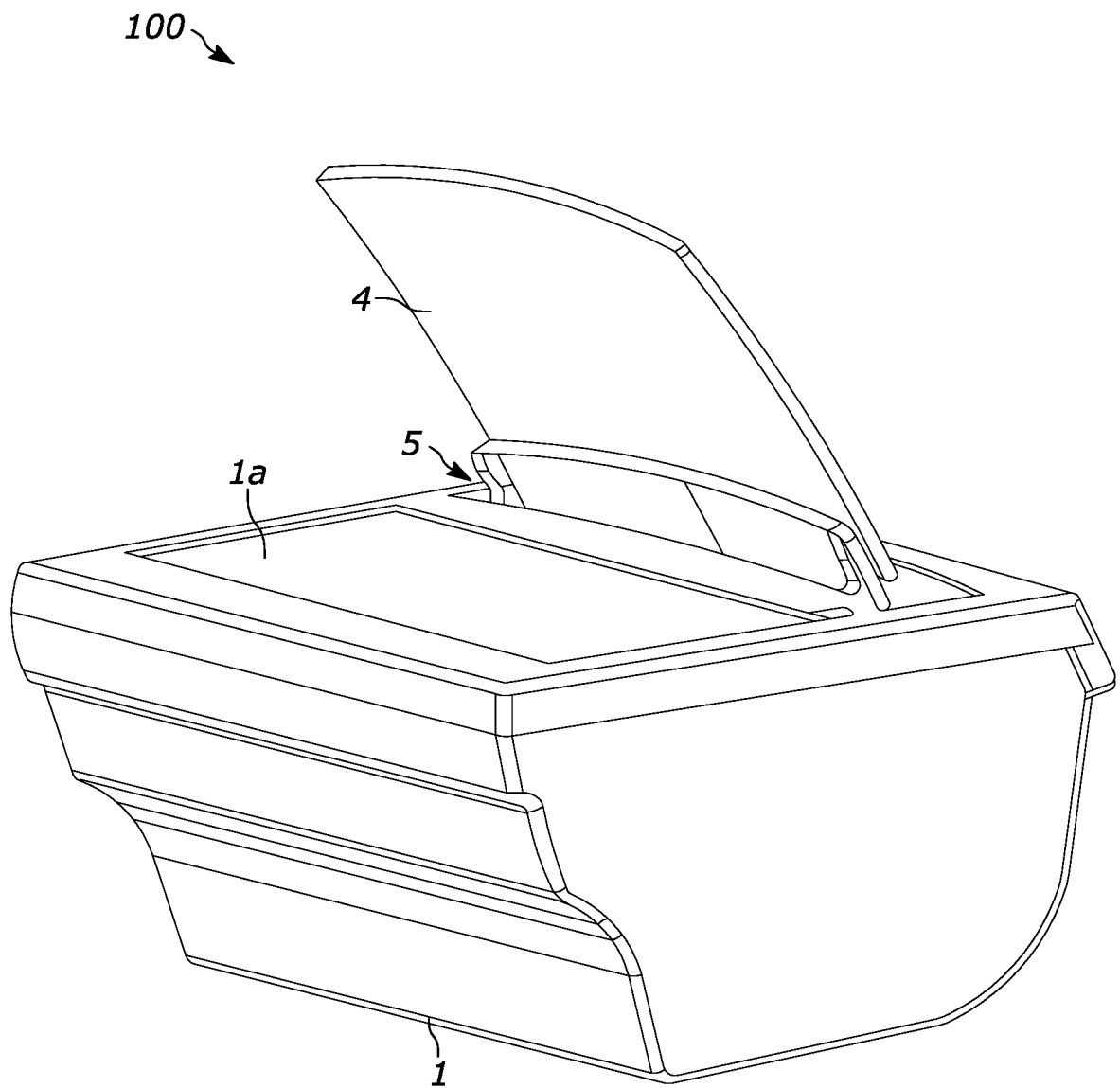
FIG. 2 is a perspective of the device shown in FIG. 1 with the flexible cover retracted and a transparent cover visible.

In FIG. 2, the head up display device is in display position and at the beginning of a fine positioning position. A combiner mirror 4 is attached to a combiner holder 5. The flexible cover 2 shown in FIG. 1 comprises a wide, multi-segment belt and is retracted into the case 1. The transparent cover 1a for the inner workings of the head up display device 100 is also clearly visible.

Figure 3:
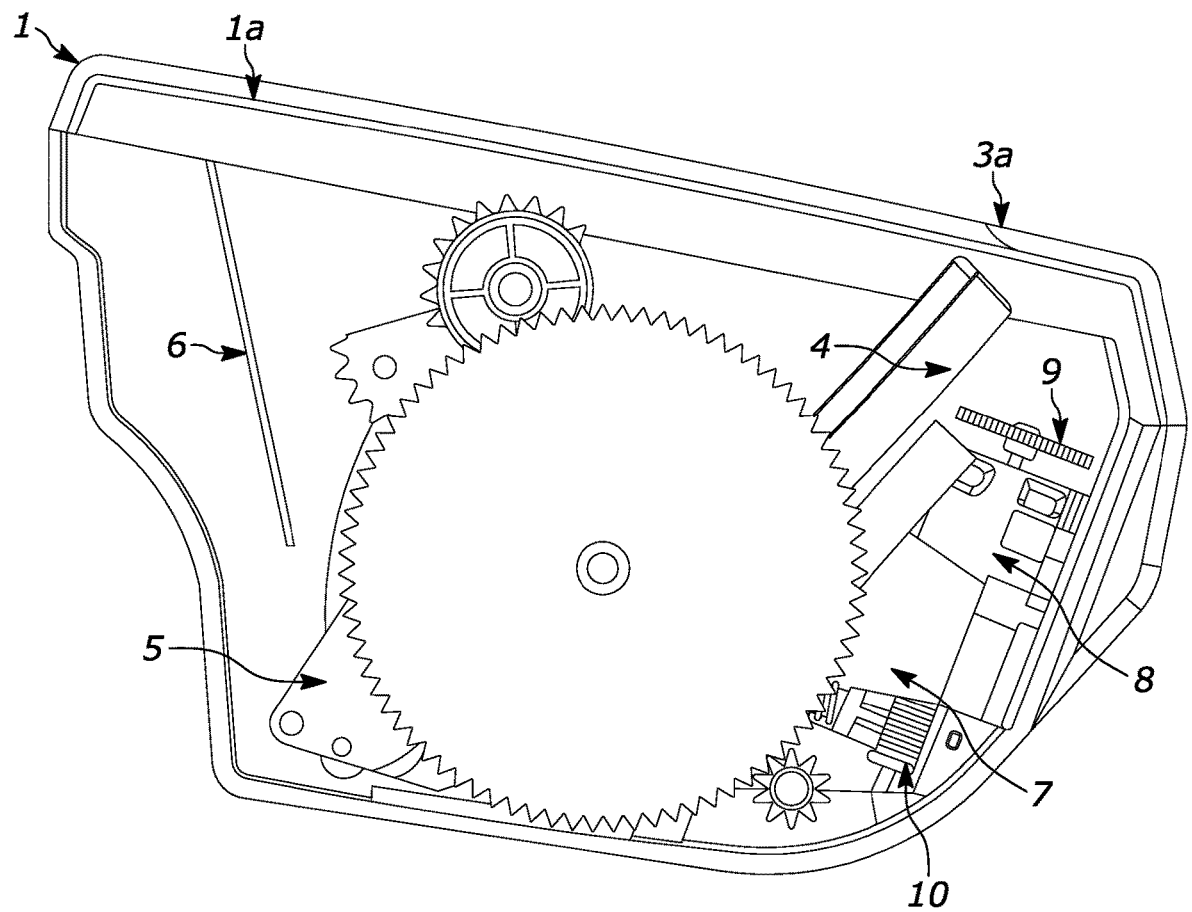
FIG. 3 is a view of the device shown in FIG. 1 with the right side removed to show among other things, a folding mirror and a picture generation unit or "PGU," motor and motor gear box.

In FIG. 3, the general operation of the head up display device 100 is shown from the right side. The folding mirror 6 and the picture generation unit or "PGU" 7 are shown for space reference. The motor unit 8 has an encoder 9 attached at one end and a motor gear box 10 on the other end.

Figure 4:
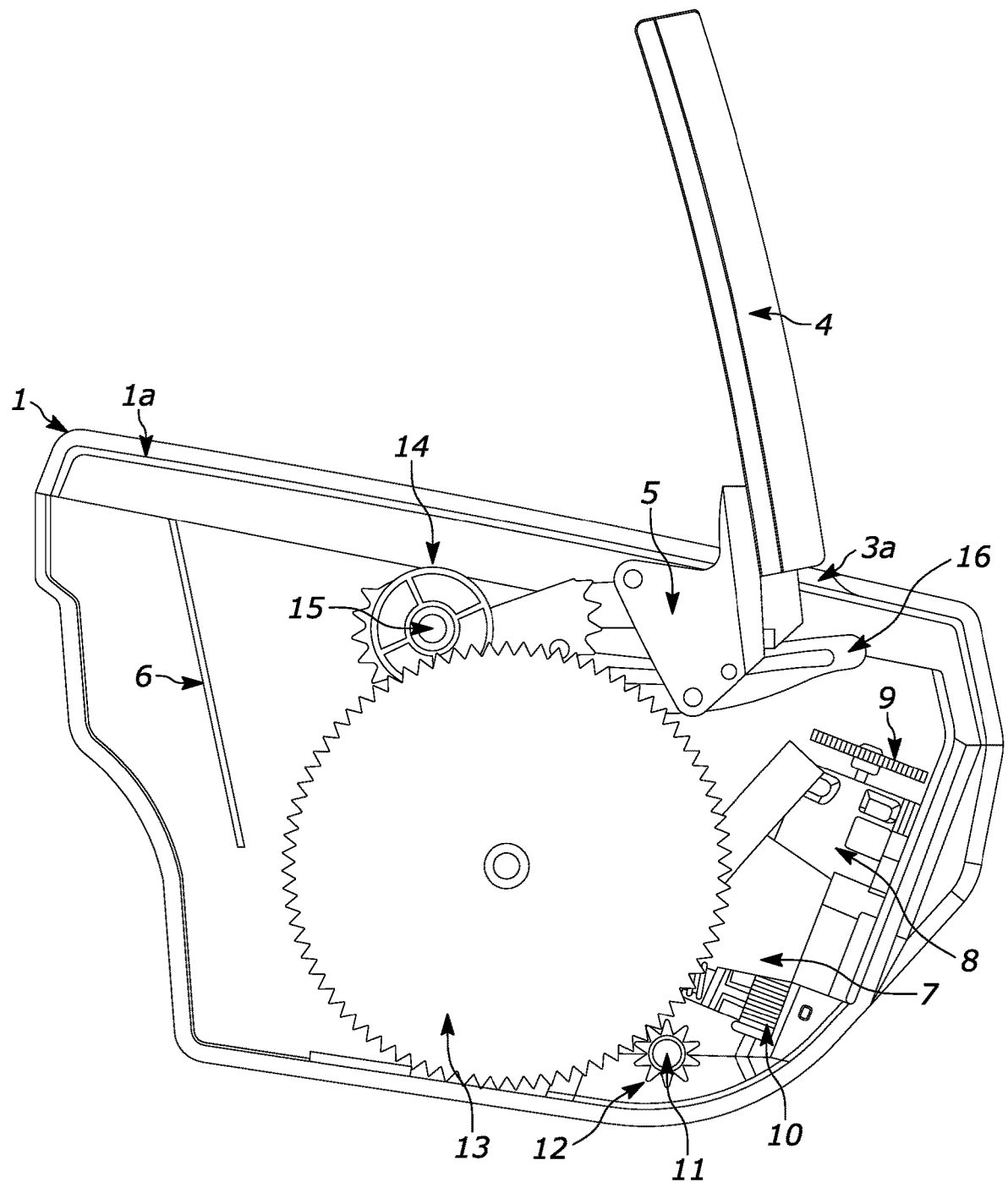
FIG. 4 shows the device of FIG. 1 in its display position.

In FIG. 4, the combiner is in a display position (fine positioning start). The motor gear box drives an input shaft 11, which drives an input pinion 12, which drives a main gear 13, which drives an elevation segmented gear 14. The elevation segmented gear 14 is attached through a different shaft 15 to an elevation arm 16.

Figure 5:
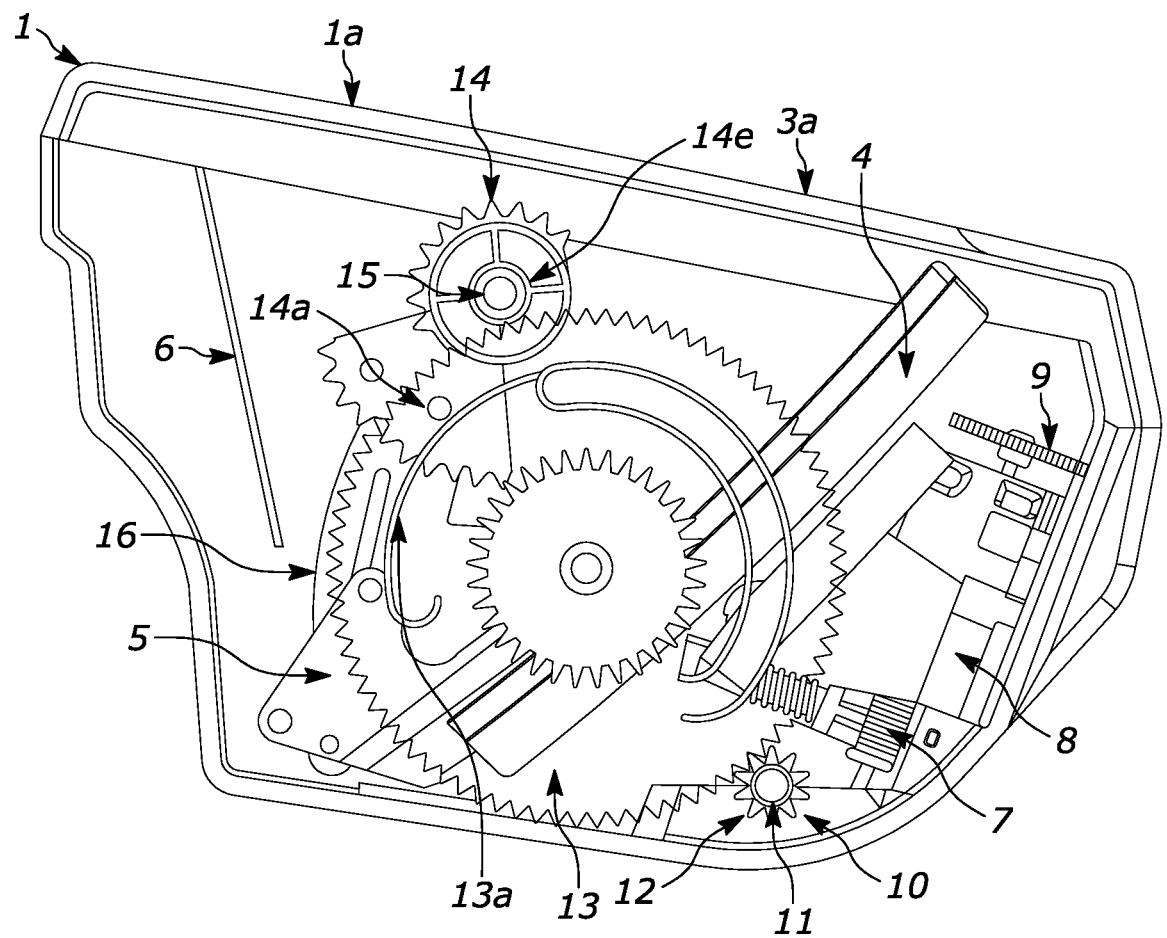
FIG. 5 shows the device of FIG. 1 in its stowed position and with the main gear transparent to show interaction of the main gear with a elevation segmented gear.

In FIG. 5, the main gear 13 is transparent to illustrate the interaction with the elevation segmented gear 14. The rails 17 illustrate the movement of the combiner holder 5. In addition, the parking blocking cam 13a is shown holding the parking pin 14a. A torsion spring 14e (not visible) is mounted on the shaft 15 in order to keep the contact between 13a and 14a.

Figure 6:
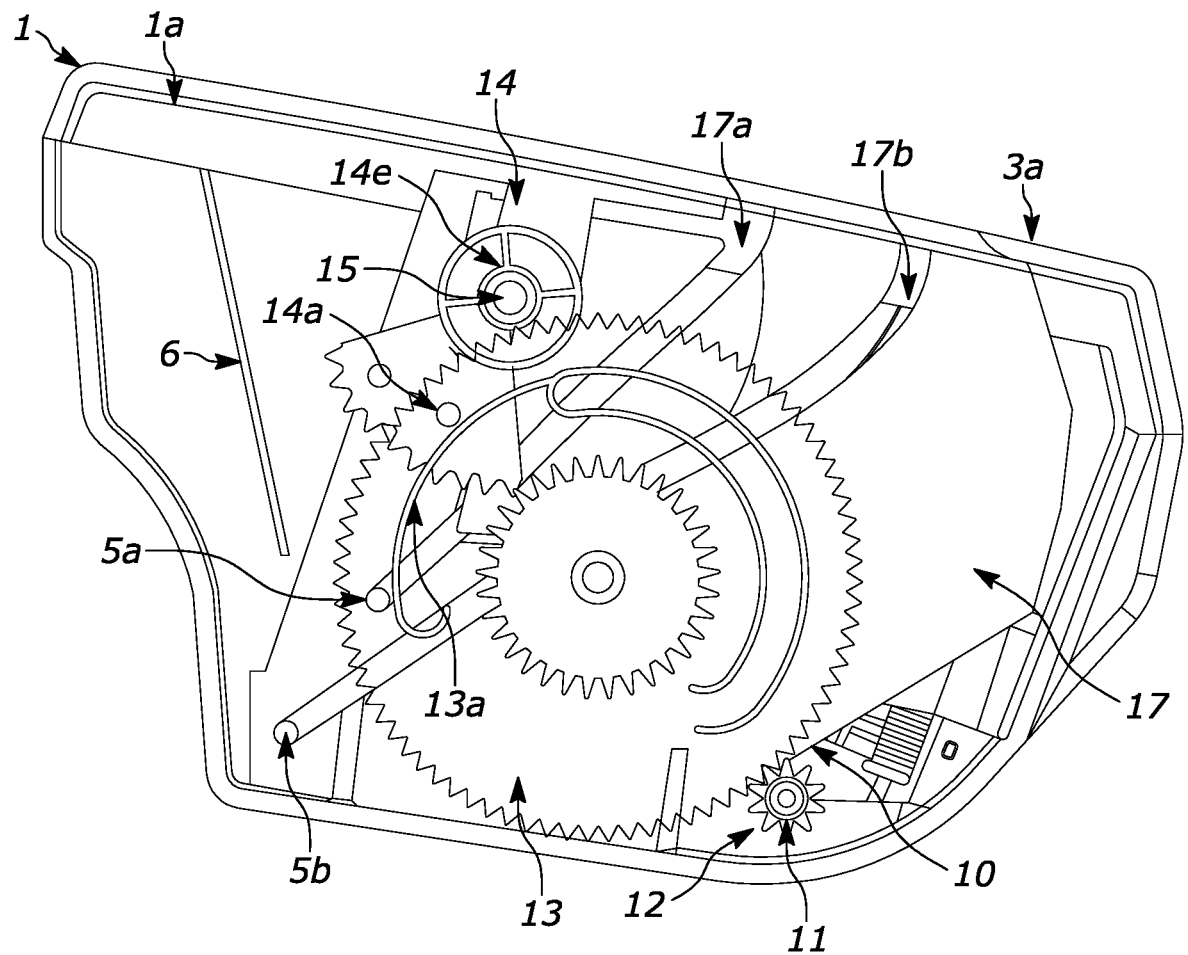
FIG. 6 is the same as FIG. 5 except that combiner sliding rails are shown.

FIG. 6 is the same as FIG. 5 except that the combiner sliding rails 17 are also shown. The upper combiner holder pin 5a and the lower combiner holder pin 5b run along rails 17a and 17b.

Figure 7:
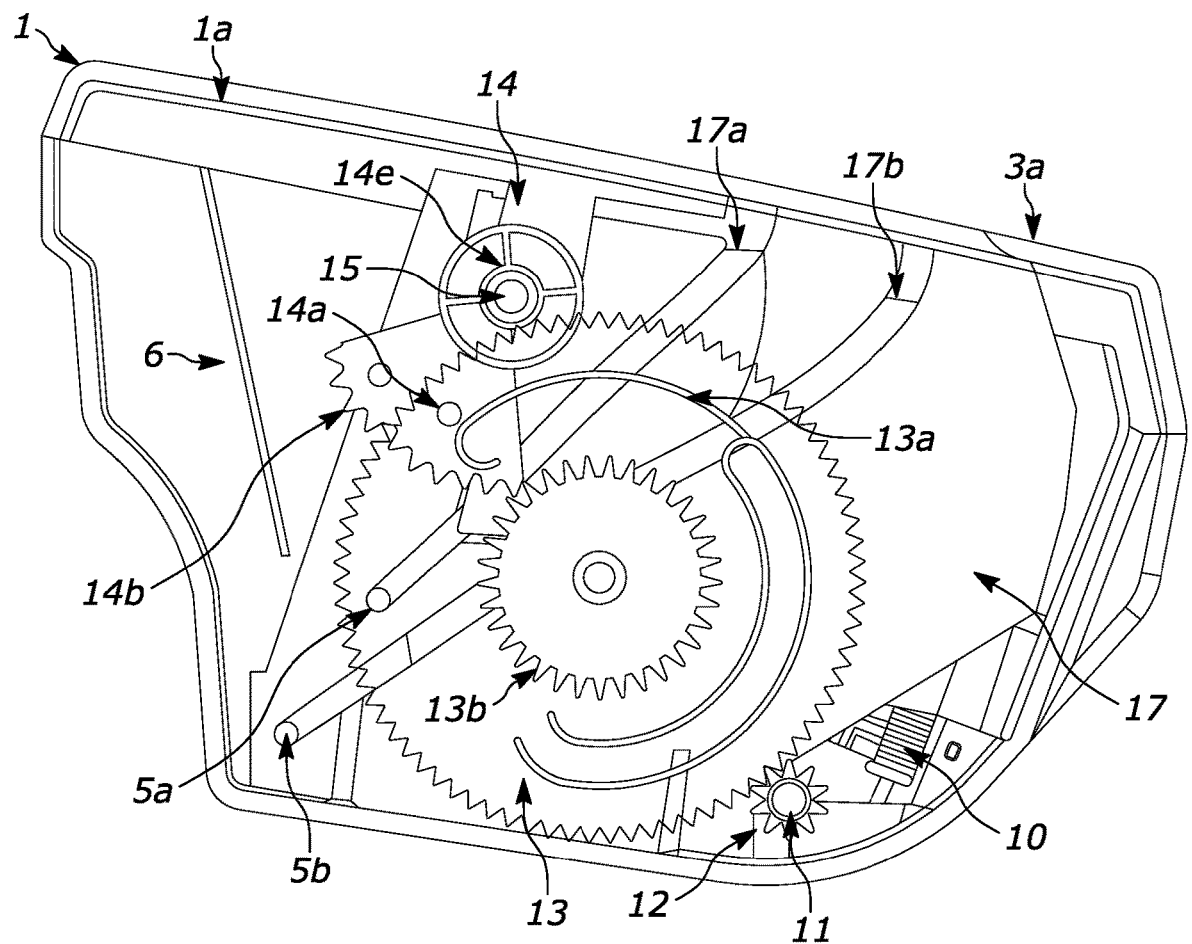
FIG. 7 shows the apparatus of FIG. 6 with a parking pin at the end of a parking blocking cam.

FIG. 7 shows the elevation start position. The parking pin 14a is at the end of the parking blocking cam 13a. Once the parking pin 14a loses contact with the parking block cam 13a, the torsion spring 14e pushes the elevation segmented gear 14 counterclockwise bringing the gearing 14b in contact with the gearing 13b at which point elevation movement starts.

Figure 8:
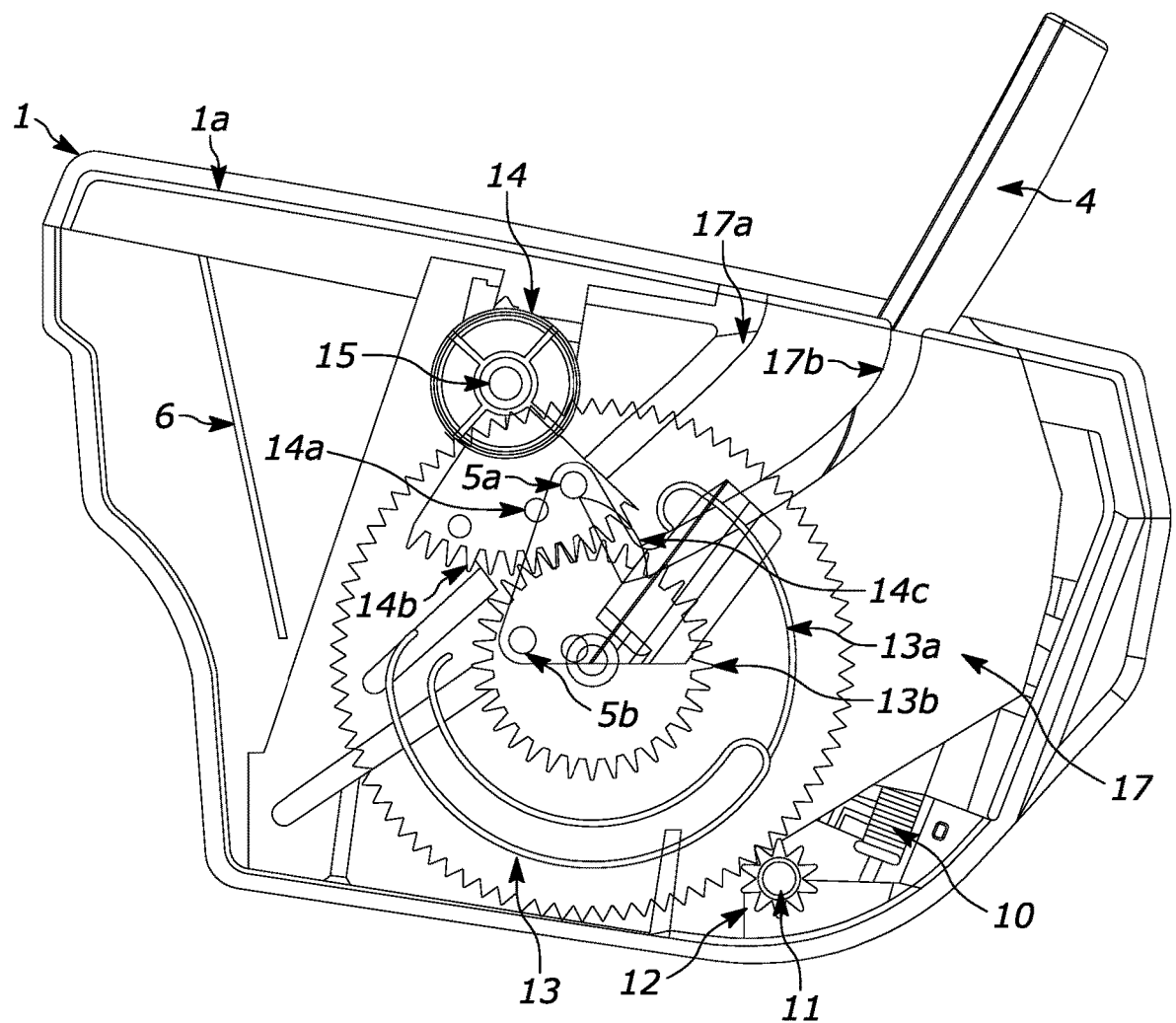
FIG. 8 shows the apparatus of FIG. 6 and FIG. 7 with the lock starting contact with the upper combiner holder pin and which will go around the lock as it arises along rail.

In FIG. 8, the elevation segmented gear 14 and the combiner holder 5 are highlighted in red. The lock 14c, which makes contact with the upper combiner holder pin 5a, which will go around the lock 14, as it arises along rail 17a. The lock 14c locks the upper combiner holder pin 5a and the fine positioning of the combiner mirror 4.

Figure 9:
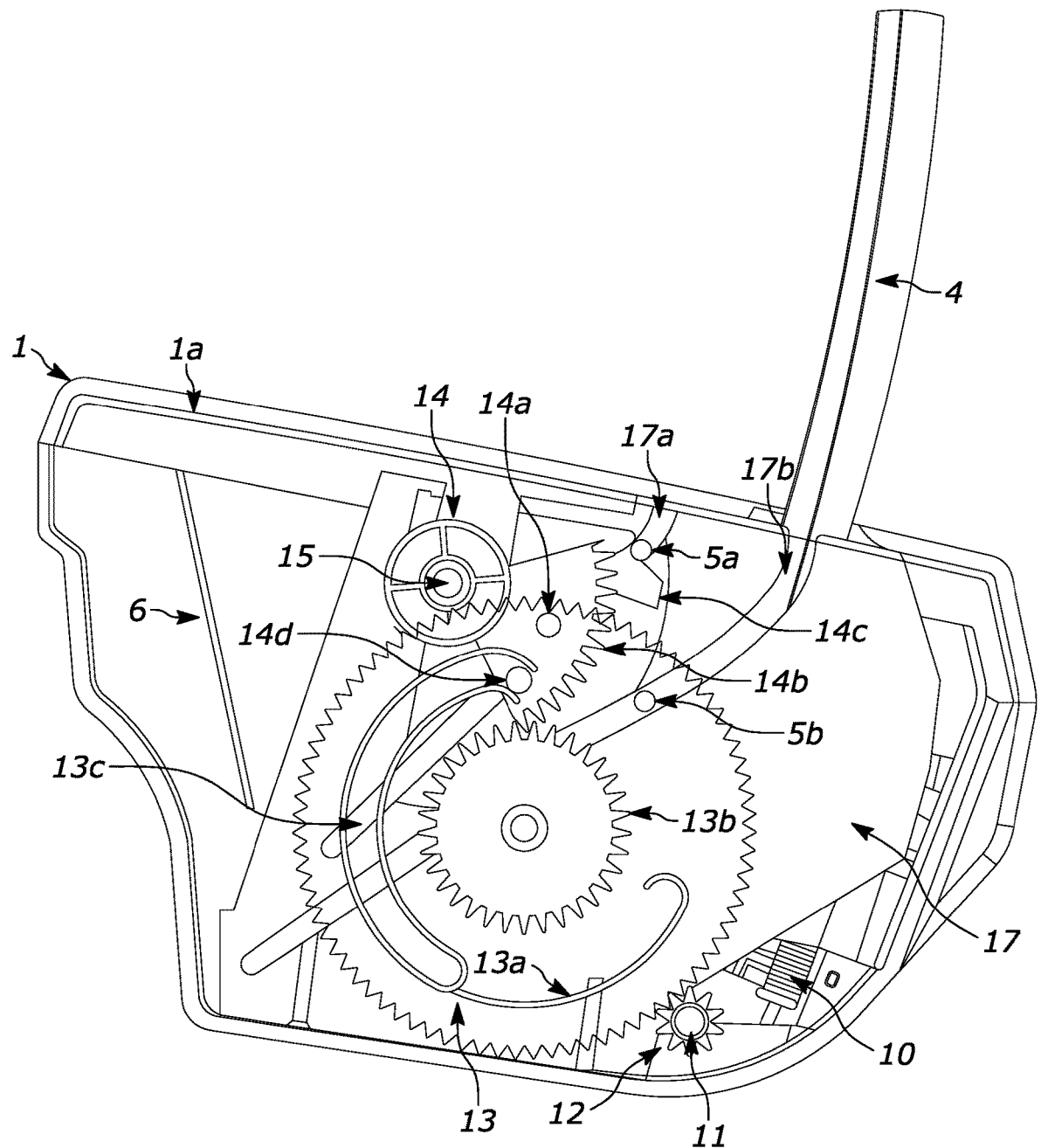
FIG. 9 shows the apparatus of FIG. 6 and FIG. 7 with the upper combiner holder pin continues to slide around the locking feature.

In FIG. 9, the fine positioning pin 14d is "caught" by the fine positioning cam 13c, which will raise the fine positioning pin 14d in order to stop the contact between gearing 13b and gearing 14b. The upper combiner holder pin 5a continues sliding around the lock 14c.

Figure 10:
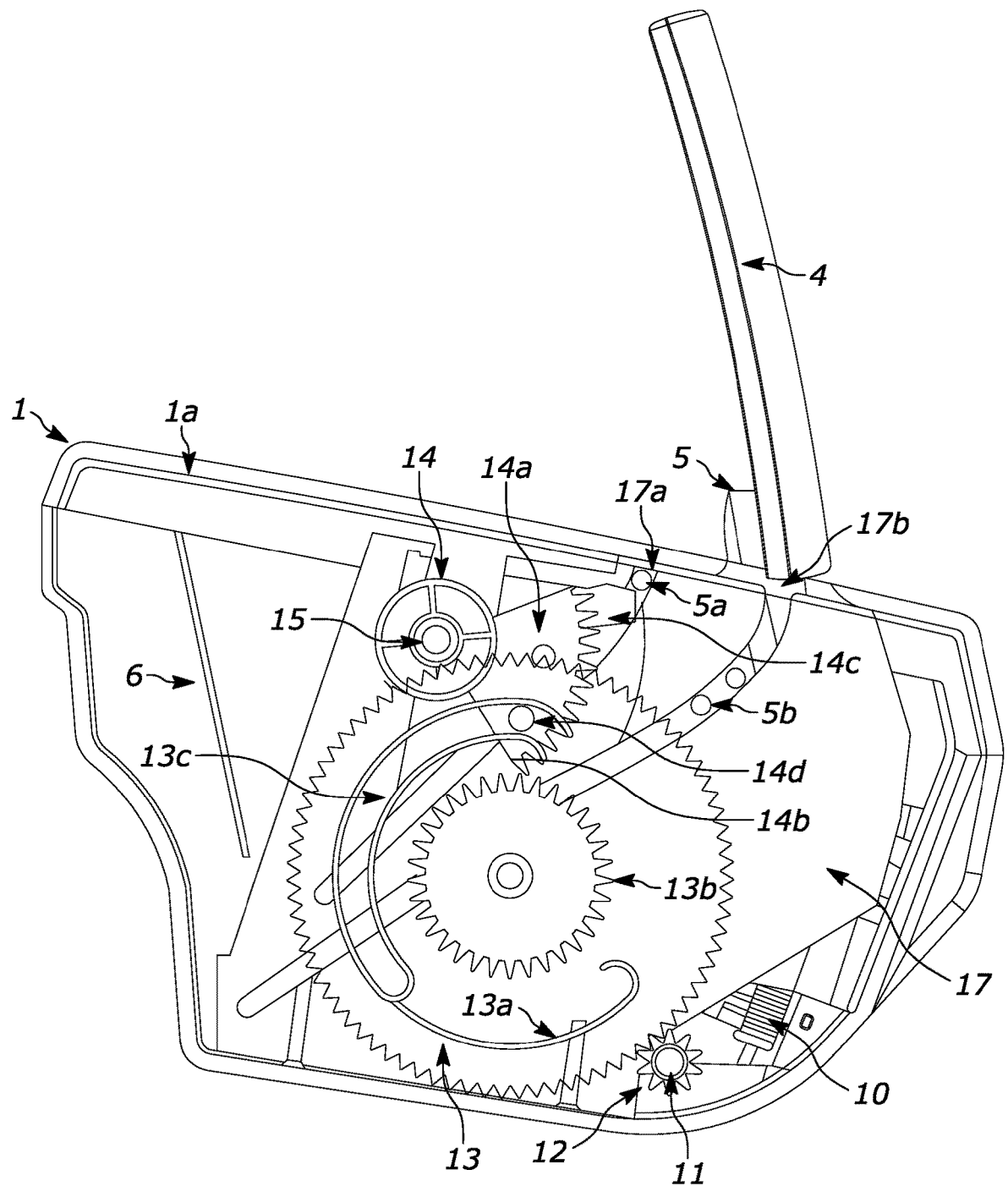
FIG. 10 shows the apparatus of FIG. 6 and FIG. 7, with the combiner mirror in its display position at the beginning of the fine positioning range and when the upper combiner holder pin 5a is locked by the locking feature.

In FIG. 10, the combiner mirror 4 has reached its display position at the beginning of the fine positioning range. The upper combiner holder pin 5a is locked by the lock 14c. The fine positioning pin 14d slides along the fine positioning cam 13c, which has a gradual increase on its diameter in order to elevate the fine positioning pin 14d. The gears 13b and 14b have lost contact with each other. The lower combiner holder pin 5b runs around the locked upper combiner holder pin 5a and along the rail 17b.

Figure 11:
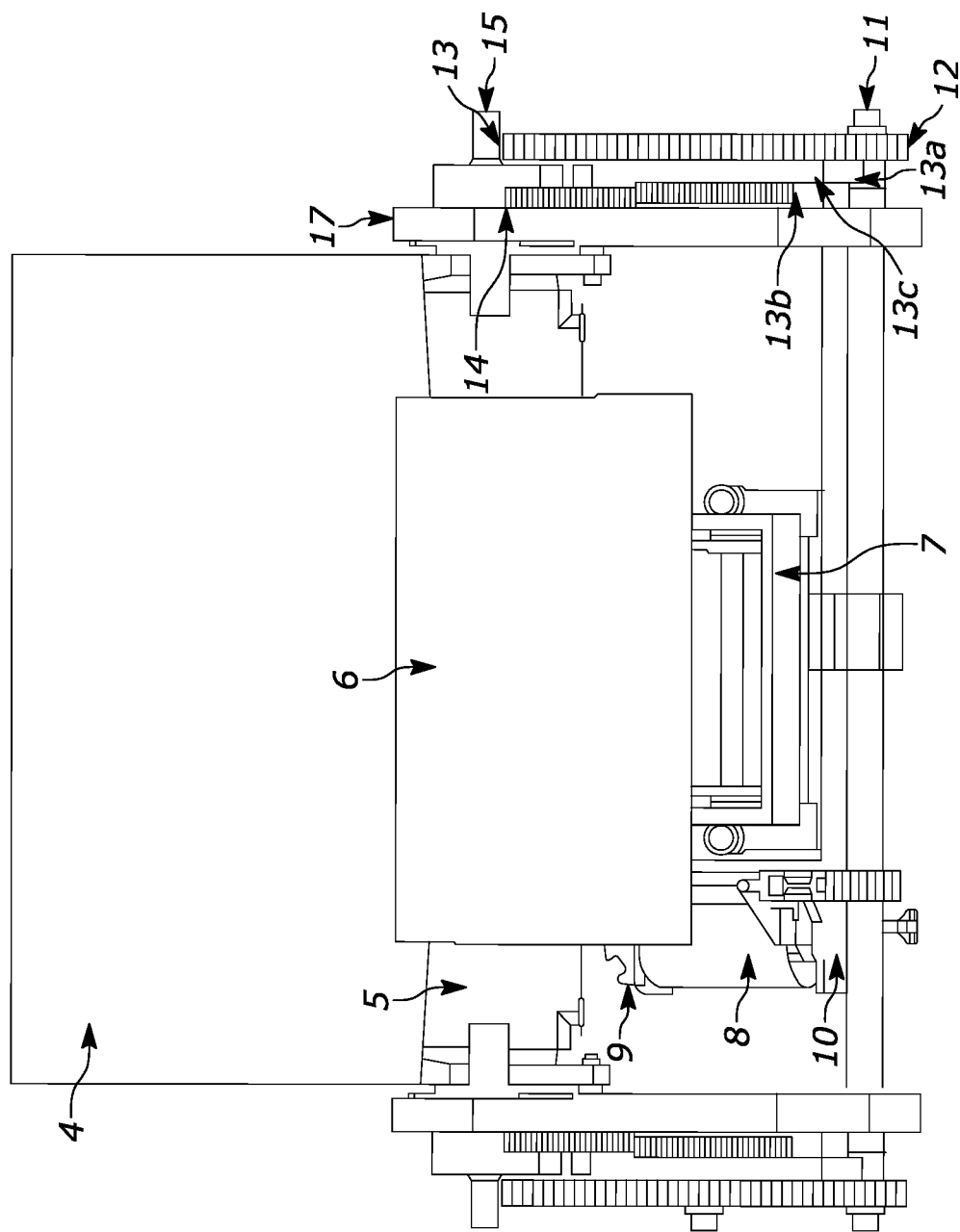
FIG. 11 is a front view of the apparatus shown in FIGS. 1-10.
Figure 12:
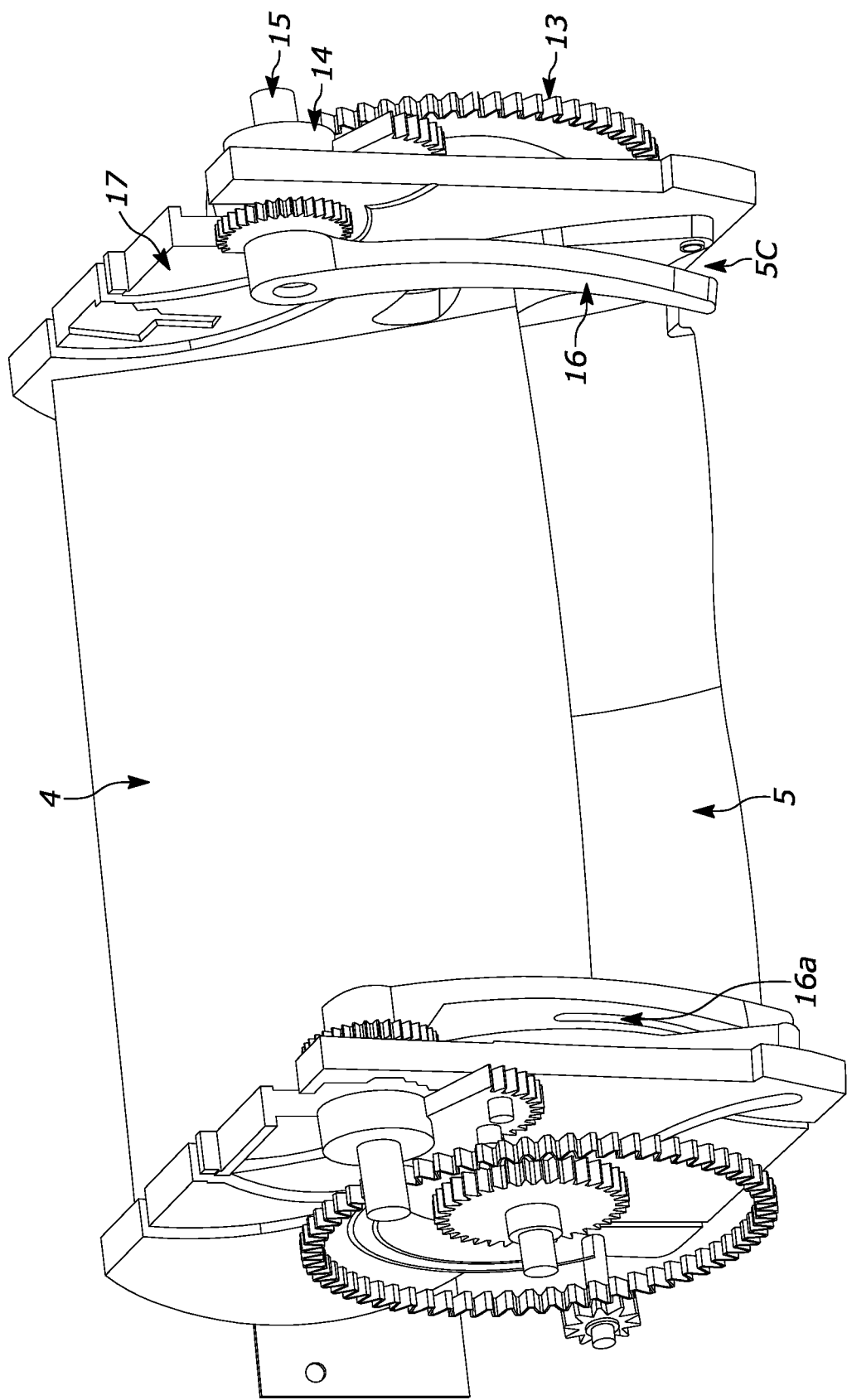
FIG. 12 shows the elevation arms.

FIG. 11 is a front view of the head up display 100 with a combiner elevation-self locking mechanism and flexible cover. FIG. 12 is a perspective view.

In FIG. 12, the elevation arm 16 is pressed on the axis 15 therefore turns in a rigid joint with the elevation segmented gear 14. The elevation pin 5c runs along the elevation slot 16a (not visible in this picture). By turning the elevation arm 16, the elevation slot 16a pushes the elevation pin 5c and the combiner holder 5 along rails 17a and 17b.

Figure 13:
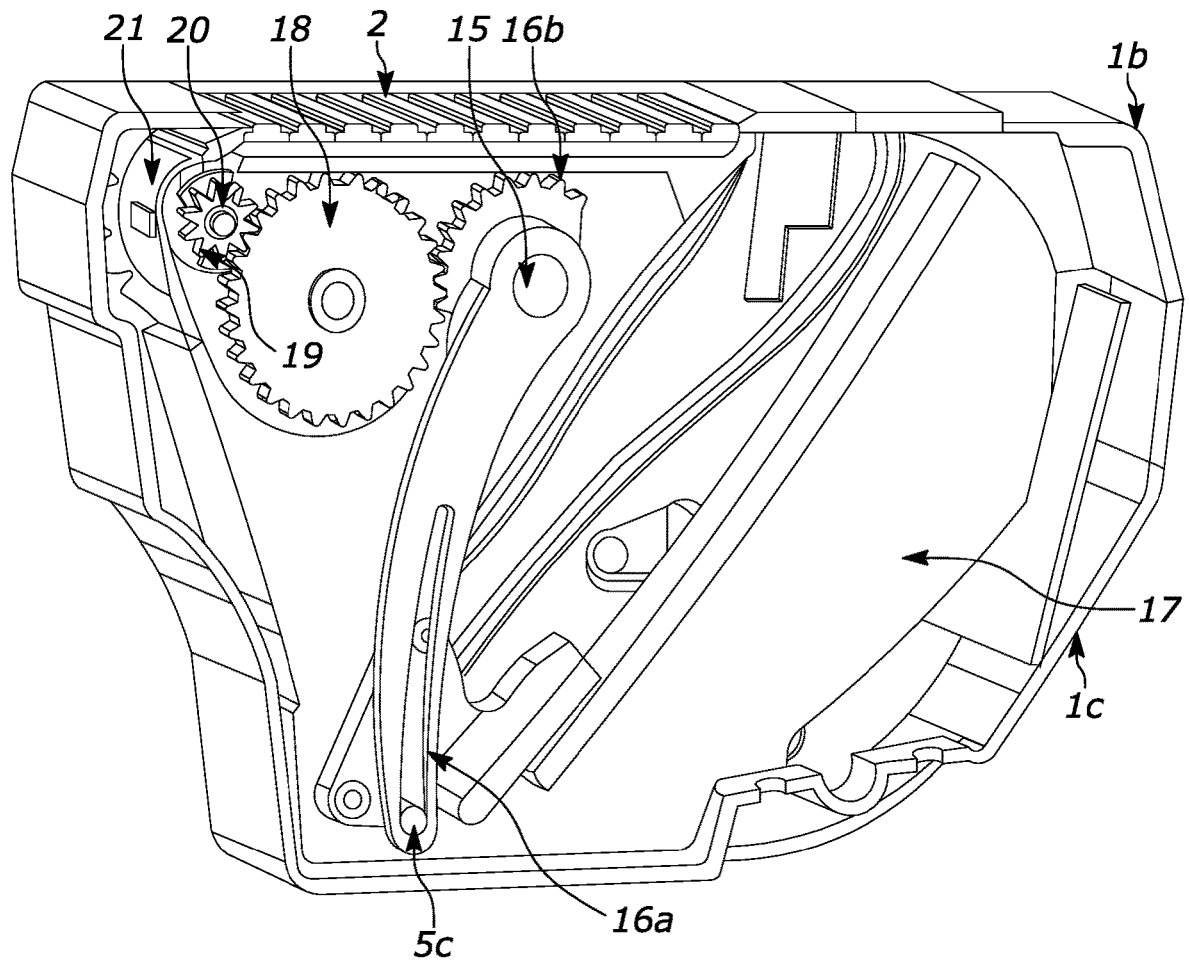
FIG. 13 shows the flexible cover in its stowed position.

FIG. 13 shows the upper housing 1b and the lower housing 1c. The flexible cover 2 is between the upper housing 1b and the upper surface of the combiner rails 17. These two bodies constrain the movement of the flexible cover 2 in the initial part of its movement. The gear segment 16b is a feature of the elevation arm 16. It drives the intermediate gear 18 which drives the pinion 19. Both the pinion 19 and the sprocket 21 are mounted on the shaft 20. The sprocket 21 drives the flexible cover 2 as a sprocket disk drives a chain in a bicycle.

Figure 14:
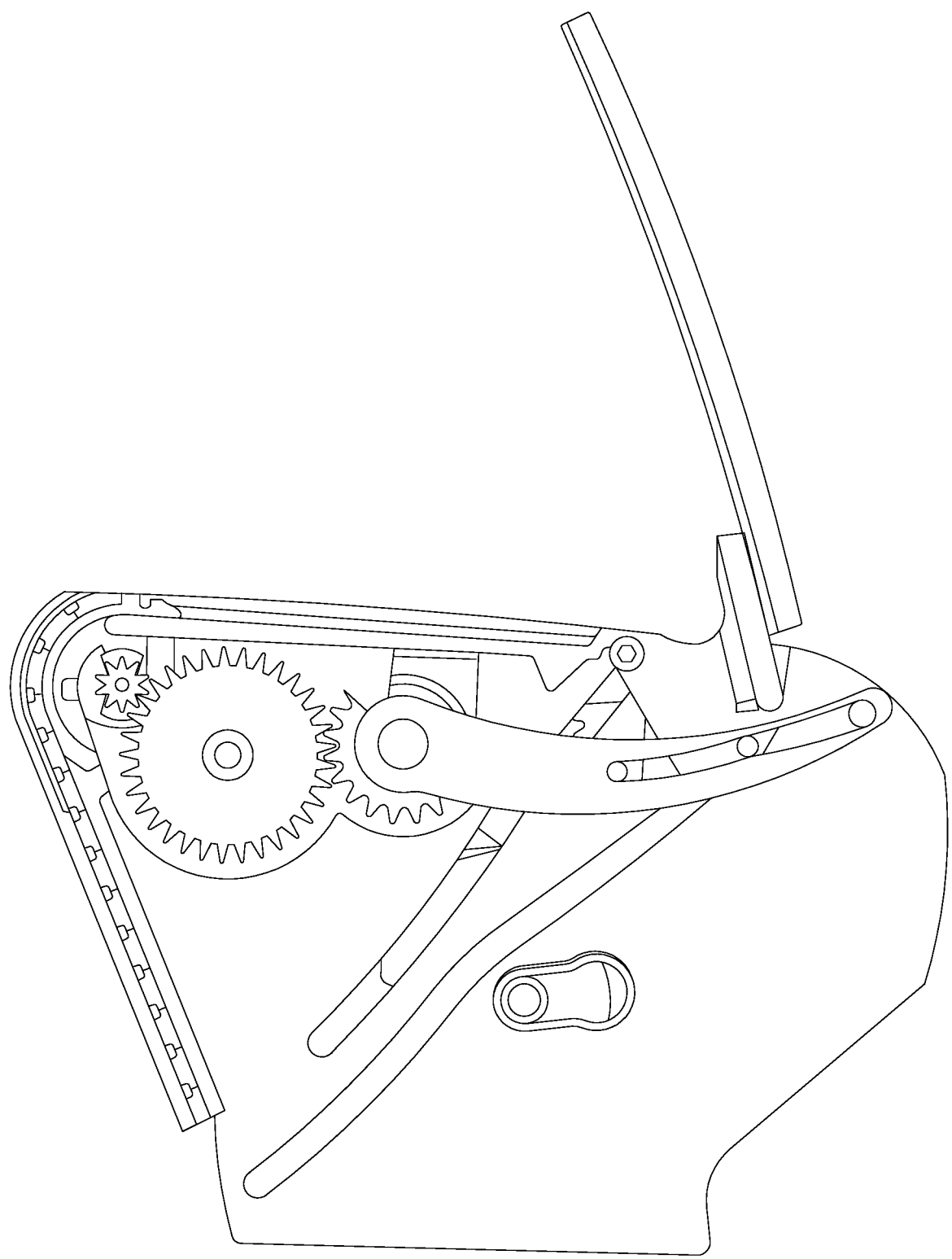
FIG. 14 shows the flexible cover mechanism in the display position.

FIG. 14 simply shows the flexible cover 2 in its "display" position, i.e., stowed and out of the way.

Figure 15:
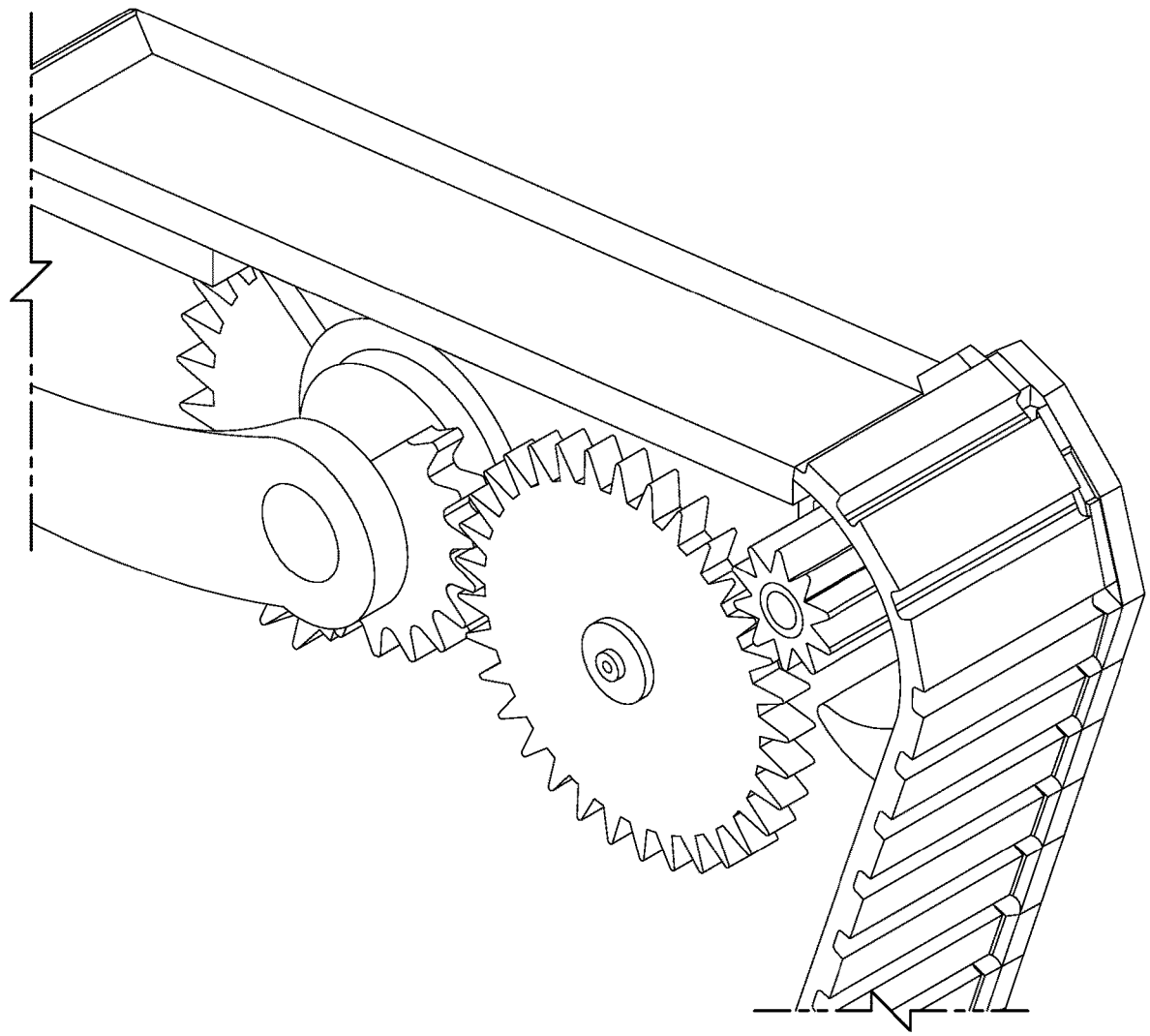
FIG. 15 shows the flexible cover drive in detail.

FIG. 15 simply shows details of the flexible cover 2 and its drive mechanism.

The foregoing is for illustration purposes only. The true scope of the invention is set forth in the claims.

What is claimed is:

1. A head up display apparatus comprising:
a case defining an interior volume;
a combiner mirror supported by a combiner holder and at least partially located in the interior volume of the case, the combiner holder including a first combiner holder pin located in a first rail within the interior volume;
an elevation segmented gear coupled to the combiner holder; and
a lock coupled to the elevation segmented gear and configured to move between an unlocked position and a locked position in engagement with the first combiner holder pin.

2. The apparatus of claim 1, further comprising a flexible cover.

3. The apparatus of claim 2, wherein the flexible cover comprises a multi-segment belt, configured to be retracted into the case.

4. The apparatus of claim 2, wherein the flexible cover selectively encloses a transparent cover.

5. The apparatus of claim 1, further comprising a foldable mirror located in the interior volume.

6. The apparatus of claim 1, wherein the segmented gear is fixed to rotate with a first shaft.

7. The apparatus of claim 6, further comprising a second segmented gear fixed to rotate with the first shaft and mechanically coupled to a flexible cover to move the flexible cover between a deployed position and a retracted position.

8. The apparatus of claim 6, further comprising an elevation arm having an elevation slot for accepting an elevation pin located on the combiner holder and a second combiner holder pin on the combiner holder located in a second rail within the interior volume.

9. The apparatus of claim 8, wherein the first rail includes a first length and the second rail includes a second length different from the first length.

10. The apparatus of claim 9, wherein the second rail extends through the interior volume from a base of the case to a position adjacent an outlet opening for the combiner mirror.

11. The apparatus of claim 1, wherein the combiner holder includes a second combiner holder pin located in a second rail within the interior volume.

12. The apparatus of claim 1, further comprising a pinion gear in driving engagement with a main gear.

13. The apparatus of claim 12, further comprising a parking block cam coupled to the main gear and configured to move between a first position blocking rotational movement of the segmented gear and a second position allowing rotational movement of the segmented gear.

14. The apparatus of claim 13, further comprising a fine positioning cam coupled to the main gear and configured to engage a fine positioning pin on the segmented gear.

15. The apparatus of claim 14, wherein the fine positioning cam includes a fine positioning pin slot for accepting the fine positioning pin and the fine positioning pin slot includes a first portion having a gradually increasing radial dimension relative to an axis of rotation of the main gear.

16. The apparatus of claim 15, wherein the first portion is located at an inlet to the fine positioning pin slot.

17. The apparatus of claim 13, further comprising a secondary gearing configured to engage the elevation segmented gear.

18. The apparatus of claim 17, further comprising a biasing spring in engagement with the elevation segmented gear and configured to bias the elevation segmented gear from a parked position towards the secondary gearing.

19. The apparatus of claim 1, wherein the elevation segmented gear includes a plurality of gear teeth forming an arc less than 180 degrees.

20. The apparatus of claim 1, wherein the elevation segmented gear includes a first edge extending radially outward from a central axis to a first plurality of teeth and a second edge opposite the first edge that extends radially outward from the central axis to the first plurality of teeth.

\* \* \* \* \*